(12) United States Patent
Herre et al.

(10) Patent No.: US 8,397,662 B2
(45) Date of Patent: Mar. 19, 2013

(54) COATING METHOD AND ASSOCIATED COATING DEVICE

(75) Inventors: Frank Herre, Oberriexingen (DE); Rainer Laufer, Mundelsheim (DE)

(73) Assignee: Dürr Systems Inc., Auburn Hills, MI (US)

( * ) Notice: Subject to any disclaimer, the term of this patent is extended or adjusted under 35 U.S.C. 154(b) by 882 days.

(21) Appl. No.: 11/755,388

(22) Filed: May 30, 2007

(65) Prior Publication Data

US 2007/0281100 A1  Dec. 6, 2007

Related U.S. Application Data

(60) Provisional application No. 60/809,261, filed on May 30, 2006.

(51) Int. Cl.
  *B05C 5/02* (2006.01)
(52) U.S. Cl. ........... 118/300; 118/320; 118/323; 901/43
(58) Field of Classification Search .................. 118/300, 118/323, 320; 901/41, 31, 40, 43; 239/223, 239/224, DIG. 11
  See application file for complete search history.

(56) References Cited

U.S. PATENT DOCUMENTS

| | | | |
|---|---|---|---|
| 4,092,440 A * | 5/1978 | Wohr et al. | 427/480 |
| 4,954,043 A * | 9/1990 | Yoshida et al. | 414/719 |
| 5,037,680 A * | 8/1991 | Papendick et al. | 428/31 |
| 5,040,482 A * | 8/1991 | McGuire et al. | 118/326 |
| 5,046,666 A * | 9/1991 | Ono | 239/73 |
| 5,353,386 A * | 10/1994 | Kasagami et al. | 700/247 |
| 5,438,647 A * | 8/1995 | Nagamatsu et al. | 700/247 |
| 5,674,570 A | 10/1997 | Fouvet | |
| 5,916,400 A * | 6/1999 | Zaher | 156/230 |
| 5,964,407 A * | 10/1999 | Sandkleiva | 239/112 |
| 5,989,643 A * | 11/1999 | Nakagawa et al. | 427/424 |
| 6,123,268 A * | 9/2000 | Chastine | 239/1 |
| 6,129,099 A * | 10/2000 | Foster et al. | 134/57 R |
| 6,197,115 B1 * | 3/2001 | Barrey et al. | 118/681 |
| 6,835,248 B1 * | 12/2004 | Haas et al. | 118/323 |
| 2002/0192357 A1 * | 12/2002 | Dion | 427/8 |
| 2004/0047995 A1 | 3/2004 | Krueger | |
| 2004/0192524 A1 * | 9/2004 | Nolte et al. | 483/59 |
| 2006/0068117 A1 | 3/2006 | Herwig et al. | |
| 2006/0145647 A1 * | 7/2006 | Kitatsuji et al. | 318/568.11 |

FOREIGN PATENT DOCUMENTS

| | | |
|---|---|---|
| DE | 2807358 A1 | 10/1978 |
| DE | 3434334 | 3/1986 |
| DE | 68909457 T2 | 3/1994 |
| DE | 19704829 A1 | 8/1998 |
| DE | 19726349 A1 | 1/1999 |
| DE | 19804202 A1 | 8/1999 |
| DE | 10010615 A1 | 9/2001 |
| DE | 10248217 A1 | 6/2003 |
| DE | 10231503 A1 | 2/2004 |
| DE | 10233006 A1 | 2/2004 |

(Continued)

OTHER PUBLICATIONS

EP1745858 Search Report dated Mar. 26, 2008.

*Primary Examiner* — Laura Edwards
(74) *Attorney, Agent, or Firm* — Bejin, VanOphem & Bieneman PLC

(57) ABSTRACT

A coating device for coating parts, in particular body components for automobiles, has at least one piece of application equipment for applying a coating to the components and has a feed device for feeding the components into a suitable coating position relative to the coating equipment. It is proposed that the feed device has at least one handling robot which brings the components into the coating position. Furthermore, a corresponding method is disclosed.

18 Claims, 8 Drawing Sheets

FOREIGN PATENT DOCUMENTS

| | | | |
|---|---|---|---|
| DE | 102004033329 A1 | 2/2006 | |
| DE | 102005033972 A1 | 1/2007 | |
| EP | 0844103 A1 | 5/1998 | |
| EP | 1187700 A1 | 3/2002 | |
| EP | 1614480 A1 | 1/2006 | |
| EP | 1827769 A1 | 9/2007 | |
| EP | 1745858 A1 | 1/2008 | |
| WO | WO-86/01747 A1 | 3/1986 | |
| WO | WO-87/06160 A1 | 10/1987 | |
| WO | WO-2006/053672 A1 | 5/2006 | |

* cited by examiner

COATING METHOD AND ASSOCIATED COATING DEVICE

CROSS-REFERENCE TO RELATED APPLICATIONS

This application is a continuation of and claims the benefit under 35 U.S.C. §119 of U.S. Provisional Patent Application Ser. No. 60/809,261 filed May 30, 2006, which is incorporated by reference herein in its entirety.

FIELD OF THE INVENTION the invention relates to a method for coating parts, in particular for coating body components for motor vehicles, and an associated coating device.

BACKGROUND

Conventional paint plants for painting motor vehicle bodies usually have a paint line with several paint booths spatially separated and arranged one after the other in which the individual paint layers are applied to the vehicle body, such as the electrophoretic dip coat (ETL), the filler, the basement and finally the clearcoat. The vehicle body is transported on a rail along the paint line in stop-and-go operation from paint booth to paint booth. When the individual paint layers are applied in the specific paint booths, the vehicle body is located spatially while the application device, such as a rotary atomizer, performs a painting motion, so that the entire surface of the vehicle body is coated by the application device. In the painting process the vehicle body does not move, while the application device moves.

Also when painting body components for vehicles, the body components are usually attached to a product carrier and positioned with a transportation device in stop-and-go operation in front of the appropriate application device, where the application device then performs a painting movement so that the entire surface of the particular component is painted. In this instance also, the component to be painted is spatially fixed during the paint operation while the application device is moved.

The prior art just described has many disadvantages which will be described in what follows.

One disadvantage is that because of the high speed of the application device movement during the painting process, losses in transfer efficiency result which are caused firstly by a movement-induced spray pattern deformation and secondly result from the high percentage of vertical paint applications.

A further disadvantage of the known paint installations is that in the individual paint booths optimal flow conditions are required in a spatially large area to achieve good paint results.

In addition, the paint booth in the known paint installations must be very large in order to avoid contamination of the booth walls from overspray.

Further, the painting speed when painting is limited due to air resistance which affects the moveable application device, or the associated application robot respectively.

Furthermore, the problem exists that the application device has to be supplied through hoses which have to be routed through the associated application robot so that hose size is restricted because of the routing through the application robot.

The hoses routed through the application robot to supply the application device are exposed to great mechanical strain because of the highly dynamic movement of the application robot, which reduces the service life of these hoses and increases maintenance costs.

Further, in the case of the application robots described initially, relatively long hose lengths and large diameters are required, which results in large paint and purging losses.

In addition, the hose routing through the application robot is complex in design, which increases the manufacturing costs for such application robots.

Beyond that, such application robots are also substantial in size since the application equipment has to be housed completely within the application robot.

Overall, this results in expensive robot and application equipment, which increases the investment costs for the customer.

In the case of the conventional painting of body components for motor vehicles described initially, there is the additional problem that for capacity reasons mostly several body components are assembled on a common component carrier. This can cause mutual influencing of the individual components when painting, which worsens the coating quality. In addition, the painting conditions inside the paint booth are not the same for all components. As a result, relatively complex suspended designs are usually required as component carriers, which additionally increases costs. Furthermore, complex studies are needed on the reachability of the individual components and cycle times in order to achieve a satisfactory painting result.

SUMMARY

It would be desirable in the invention, therefore, to improve the known coating device described initially and to avoid one or more of the disadvantages listed previously. It would be desirable in the invention, in addition, to specify a suitable coating procedure.

It would be desirable if the invention is achieved by a coating procedure and an associated coating device.

The invention can embrace the general technical teaching to move the components to be coated in a coating process into the suitable coating positions, where the positioning of the individual components is preferably managed by a handling robot. The components to be coated can be moved during the coating, whereas the components to be coated in the conventional painting installations described initially are spatially fixed during coating.

The term used within the scope of the invention of handling robot is to be understood in a general sense and includes for example multi-axis robots and hoists.

Preferably the components to be coated are moved in each instance by a single handling robot, but the possibility also exists that the components to be coated are moved jointly by several handling robots, which makes sense in the case of large and heavy components.

In addition, the handling robot preferably picks up several components and moves the components into the respective coating position. This is advantageous since painting speed can be increased by the common pickup and movement of several components.

A holding device is preferably provided for the common pickup and holding/fixing of several components which picks up the individual components and locates the components during the painting process. For example, such a holding device for locating the components to be coated can have one or more hooks, eyes, grippers, suction cups, magnets and/or clamping-spreading devices. In the case of electrostatic coating using an electrically charged coating medium, it is advantageous if the holding device electrically grounds the components being held so that the electrostatically charged coating medium adheres as well as possible to the components to be coated. The holding device can include, therefore, an electrically conductive material or have a separate electrical ground.

In a variant of the invention, the application devices is in a fixed location so that the relative motion between the application device and the components to be coated is performed solely by the handling robot which holds the components.

Alternatively, it is also possible that the application device is also guided moveably in space so that the relative motion between the application device and the components to be coated comes about both from the motion of the application device and the motion of the handling robot. For example, the application device can be installed for this purpose on a multi-axis application robot, a wrist axis, a parallel kinematic, or a lifting machine. It is additionally also possible that the application device is guided by an application robot which has a linear axes in all three spatial directions.

The application robot can be located in a paint booth, for example, on the ceiling or the wall of the booth, where a hanging assembly of the application device on the ceiling of the paint booth is positive for airflow since a stream of fresh air usually flows through the paint booth from above.

Furthermore, within the scope of the invention the possibility exists that the components are coated by several application devices which can be operated simultaneously to increase surface performance.

With several application devices, the alternative possibility also exists that the handling robot brings the components to be coated in succession into a suitable coating position relative to the individual application devices so that the application devices operate sequentially.

The arrangement of several application devices also offers the advantage that the individual applications devices can apply the coating means alternatively in what is known an A/B operation, where one application device applies the coating (A operating phase), while the other application device is carrying out a color change (B operating phase). This allows uninterrupted coating operation even with a color change.

The individual application devices can apply different coatings. For example, one application devices can apply a basecoat, whereas the other application device can apply a clearcoat to the specific component.

The individual application devices can differ by reason of a different structural makeup. For example, in the case of one application device it may be a rotary atomizer, whereas the other application devices is designed as an air atomizer.

Further, as part of the invention, the possibility exists that in one paint booth several or even all paint layers can be applied to the individual components, The individual paint layers can be applied sequentially or in parallel (e.g. wet-on-wet).

Preferably, however, several spatially separated paint booths are provided, where the possibility exists that one handling robot furnishes several paint booths with the components to be coated. The individual paint booths can be arranged in a circular or star-shaped formation around the handling robot, which makes it easier for the handling robot to access the individual paint booths.

Furthermore, the possibility exists that at least two handling robots are disposed as part of the invention in one paint booth, where one of the handling robots holds one component in the coating position relative to the specific application device while the other picks up or deposits another component. In this way, the surface coating performance can be optimized since the coating does not have to be interrupted during the pickup and deposit of the components.

In addition, the coating device in accordance with the invention can be devised in such a way that the components are stacked up in front of a paint booth so that components are always available for the handling robot and thus no waiting times build up. The subsequent procedural steps of the coating device are then preferably carried out in such a way that no backup, and consequently no loss of time, in the paint booth results at the exit of the paint booth. This means that the supply of components to be coated to a paint booth is carried out in a first cycle time, while the coating of the components in the paint booth is performed with a second cycle time, whereas the continuing transport of the components from the paint booth and their processing is carried out in a third cycle, where the first cycle time and/or the third cycle time are shorter than the second cycle time. As a result of a relatively short first cycle time, sufficient components are always available at the entry side of the paint booth so that no waiting times occur until new parts are delivered. As a result of a relatively short cycle time, the coated components are picked up quickly at the exit of the paint booth so that there are no waiting times there.

It was already mentioned that a stream of fresh air is preferably introduced into the paint booth, which is known per se from conventional painting installations. Preferably, the handling robot brings the components to be coated into the paint booth in the direction of the stream of fresh air, meaning usually from above. This is advantageous since during a color change no, or only minor, time losses result when the paint is operated empty in order to avoid overspray on the subsequent components. The rapid removal of the painted components from the paint booth and the rapid introduction of the next components into the paint booth reduces the lost time during a color change to the color change time itself for the application equipment to the time for the removal of overspray from air sink speed.

Preferably the handling robot during a color change consequently moves opposite to the stream of fresh air into a fresh air zone in order to be able to re-commence there with the application of a new color as quickly as possible. With the conventional introduction of the stream of fresh air from the top to the bottom, the handling robot moves upward inside the paint booth during a color change, since the overspray from the color used previously has largely dropped down, which is the result firstly of the downward flow of fresh air and secondly of gravity.

It should be mentioned further that the application technology can be accommodated in or on the particular application robot, for example in a robot arm of the application robot. This allow short hose lengths, color change times and reaction times. Furthermore, the service life for the hose packages used is improved and fewer paint and purging agents losses occur.

An electrically insulated design can be used for an electrostatic coating equipment in which structural elements in the robot arm of the application robot and parts of the robot are under high voltage and consequently repel the electrostatically charged paint mist.

Other advantageous refinements of the invention are explained in greater detail in what follows with the description of the detailed embodiments using the Figures. Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
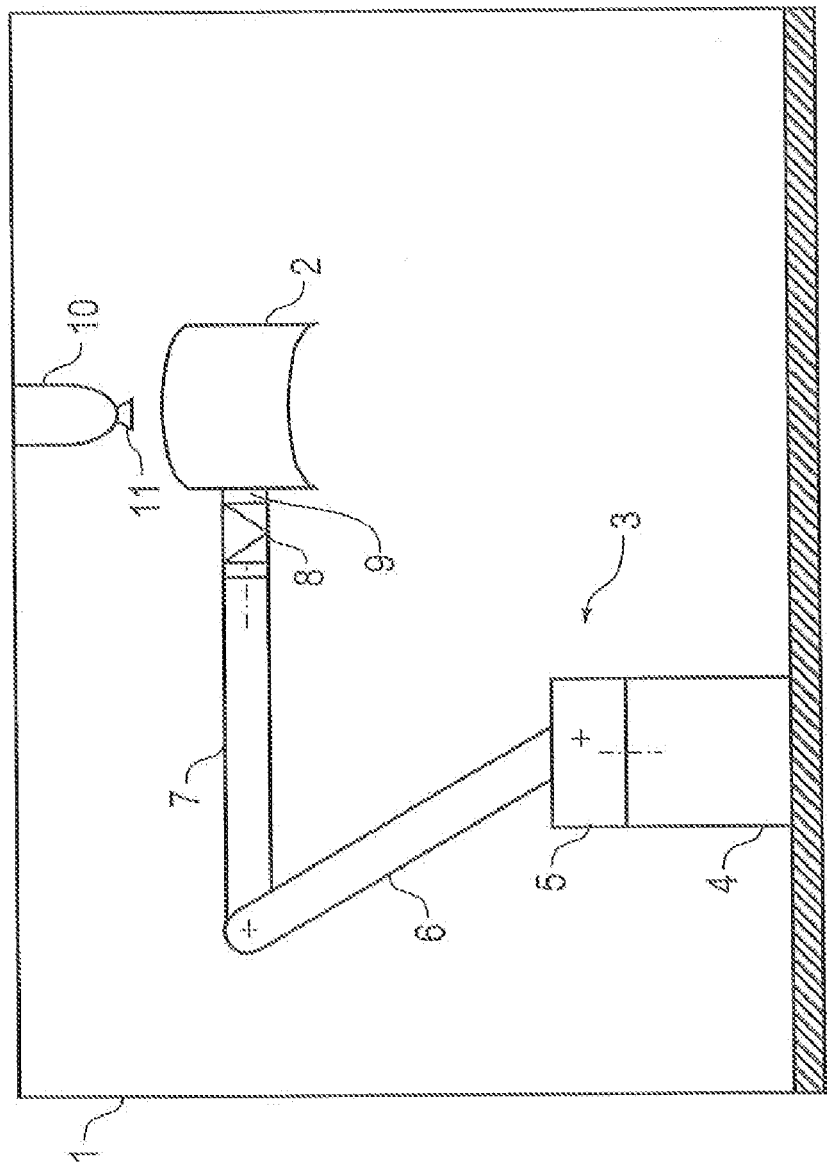
FIG. 1 shows a simplified, schematic representation of a paint booth with a handling robot for positioning the components to be coated and a rotary atomizer which is solidly attached to the roof of the paint booth.

The simplified cross-sectional representation in FIG. 1 shows a paint booth, in which a component 2 can be painted, where, in the case of the component 2, it may be for example a body component for a motor vehicle.

The positioning of the component 2 inside the paint booth 1 is carried out by a multi-axis handling robot 3 which may be largely of conventional construction and therefore is only described briefly in what follows. The handling robot 3 is attached by means of a solidly-mounted based part 4 to the floor of the paint booth 1, or to its foundation, and has a rotatable carousel 5 which can be rotated about an axis relative to the base part 4, shown by a dashed line. The carousel 5 carries a rotatable robot arm 6, to whose distal end an additional rotatable robot arm 7 is attached. The robot arm 7 carries on its distal end in turn a multi-axis robot wrist arm axis 8 which carries a magnetic gripper 9 which magnetically holds the component 2 to be coated. However, in place of the magnetic grippers 9, other grippers can be installed on the robot wrist axis, such as suction cups and/or clamp-spreading devices.

The coating of the component 2 is performed by means of a conventional rotary atomizer 10 with a rapidly rotating bell cup 11, where the rotary atomizer 10 is installed suspended from the ceiling of the paint booth 1 and has no freedom of motion in this example.

During the coating procedure a stream of fresh air is brought from above through the ceiling of the paint booth 1 into the paint booth 1, which is also known per se. The hanging installation of the rotary atomizer 10 on the ceiling of the paint booth 1 offers the advantage that the application of the coating by the rotary atomizer 10 is not obstructed by the vertical flow of fresh air. In addition, the assembly of the rotary atomizer 10 to the ceiling of the paint booth 1 offers the advantage that the color change time is relatively short, since the coating in the paint booth 1 is applied downward and the removal of the old coating during a color change is also carried out downwards in the direction of the stream of fresh air. The overspray dispersed in the paint booth 1 sinks by reason of the downward directed flow of fresh air and because of the similarly downward directed force of gravity, which results in a relatively fast emptying of the paint booth 1 during a color change and allows a fast color change.

Figure 2:
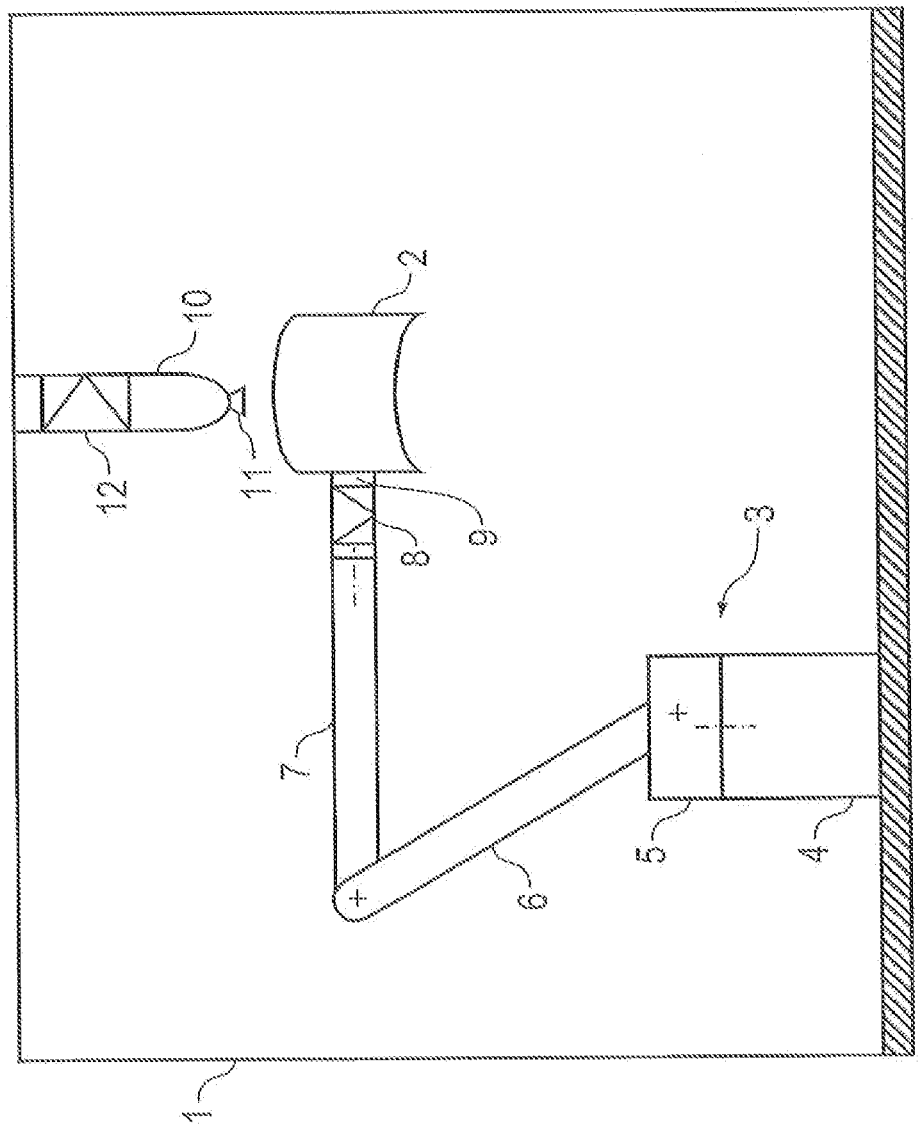
FIG. 2 shows a similar paint booth in which the rotary atomizer is, however, installed moveably to the ceiling of the paint booth by means of a multi-axis wrist axis.

The embodiment shown in FIG. 2 of paint booth in accordance with the invention is largely identical to the embodiment described previously and shown in FIG. 1, so that reference is made to the previous description to avoid repetitions, where the same reference numerals are used for identical parts.

One special feature of this embodiment is that the rotary atomizer 10 is mounted highly moveably to the ceiling of the paint booth 1 by means of a multi-axis wrist axis 12. In this embodiment both the component 2 to be coated and the rotary atomizer 10 can be moved to permit a painting procedure that is as fast as possible.

Figure 3:
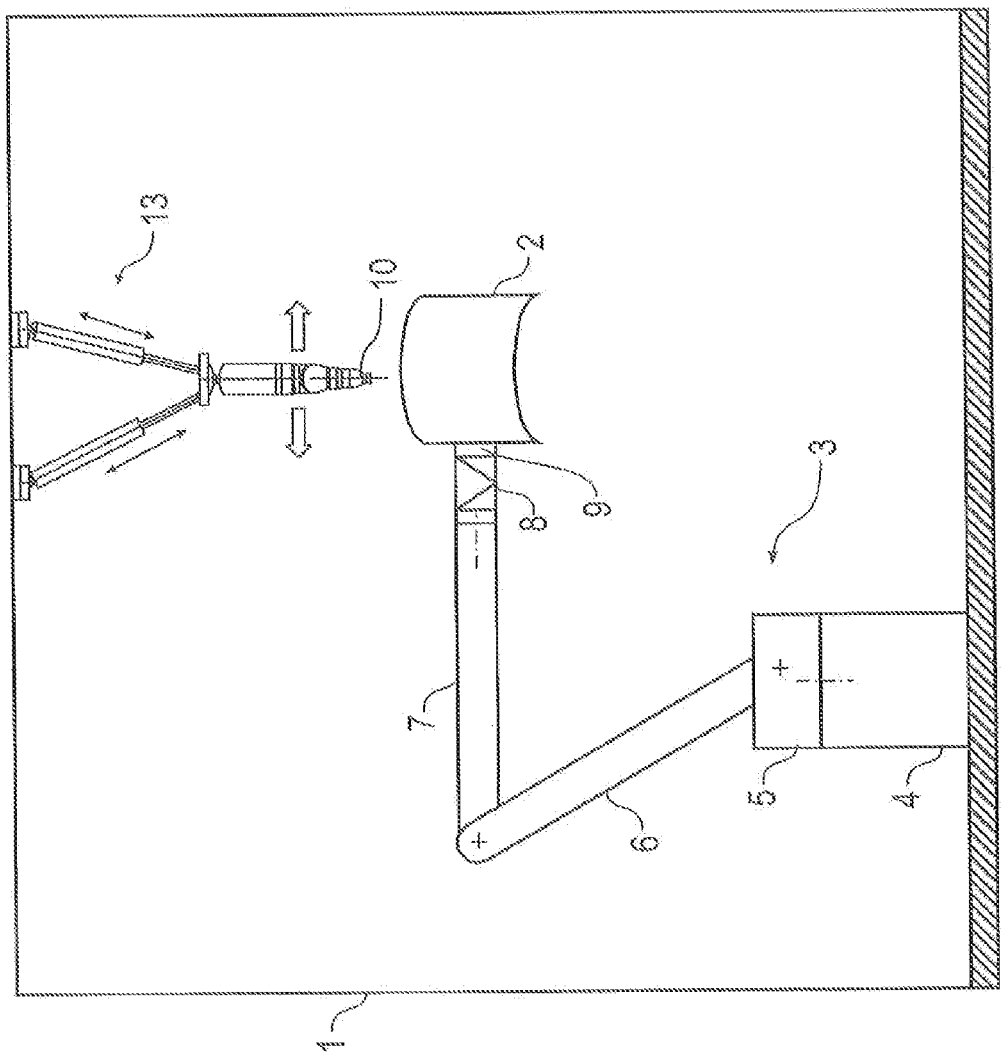
FIG. 3 shows a further similar embodiment of such a paint booth in which the rotary atomizer is fastened by means of a parallel kinematic to the ceiling of the paint booth.

A further similar embodiment is shown in FIG. 3, which is largely identical to the previously described embodiments so that reference is made to the previous description to avoid repetitions, where the same reference numerals are used for identical parts.

One special feature of this embodiment is that the rotary atomizer 10 is mounted moveably to the ceiling of the paint booth 1 by means of a parallel kinematic 13. The construction and the operation of the parallel kinematic 13 is described, for example, in German patent application 10 2004 033 329.7 (published as EP 1 614 480 A1 on Jan. 11, 2006). The content of this patent application is therefore incorporated by reference into the present description with respect to the construction and operation of the parallel kinematic 13, so that a detailed description of parallel kinematic 13 can be dispensed with at this point.

Figure 4:
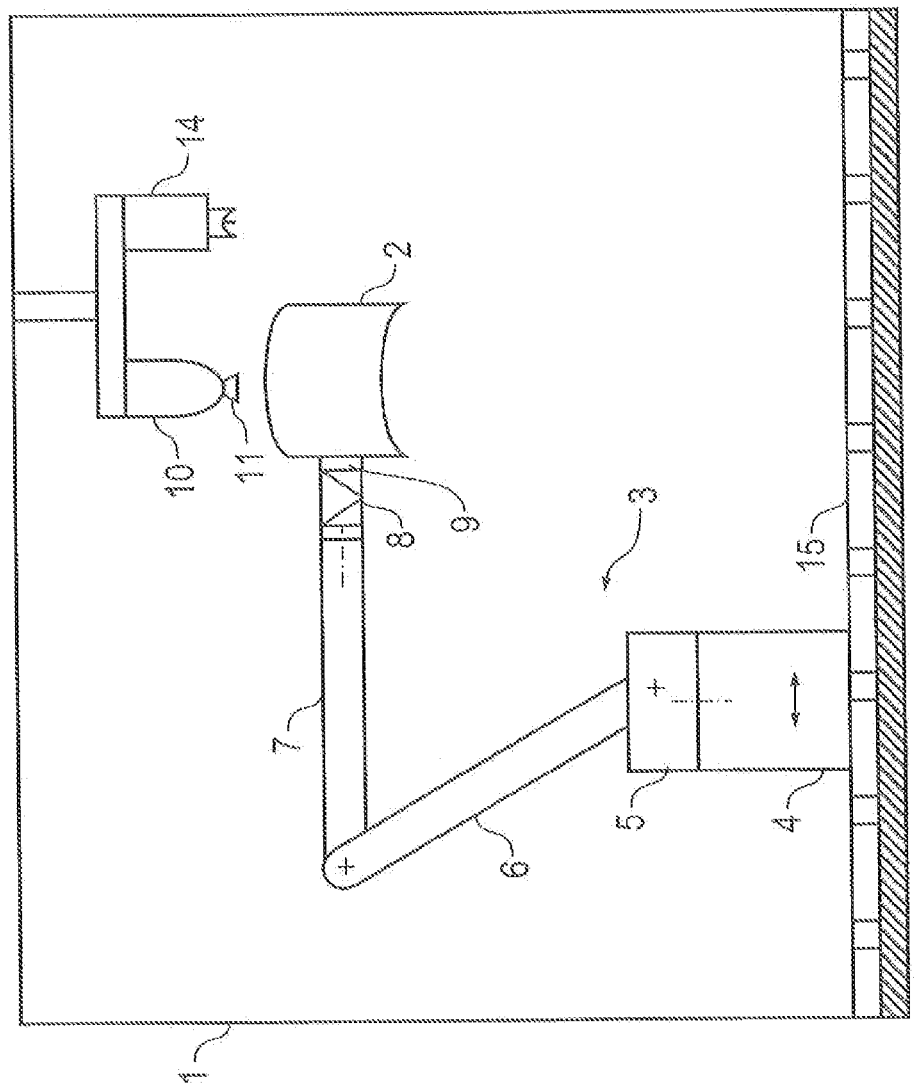
FIG. 4 shows an further embodiment of a paint booth in accordance with the invention, in which the handling robot can be moved on a rail, while both a rotary atomizer and an air atomizer are attached to the ceiling of the paint booth.

FIG. 4 in turn shows an embodiment of a paint booth 1 which is partially identical to the previously described embodiments so that reference is made to the previous description to avoid repetitions, where the same reference numerals are used for identical parts in what follows.

One special feature of this embodiment is that not only the rotary atomizer 1 is mounted to the ceiling of the paint booth 1 but also an additional air atomizer 14. An additional rotary atomizer can be mounted in place of the air atomizer 14 so that two rotary atomizers are disposed in the paint booth 1.

The rotary atomizer 10 and the air atomizer 14 can be operated in succession in order to apply different coatings (e.g. first application/second application, basecoat/clearcoat). The handling robot 3 then positions the component to be coated 2 successively in a suitable coating position relative to the rotary atomizer 10 or the air atomizer 14.

A further special feature of this embodiment is that the handling robot 3 is moveable on a rail 15 in the direction of the arrow.

Figure 5:
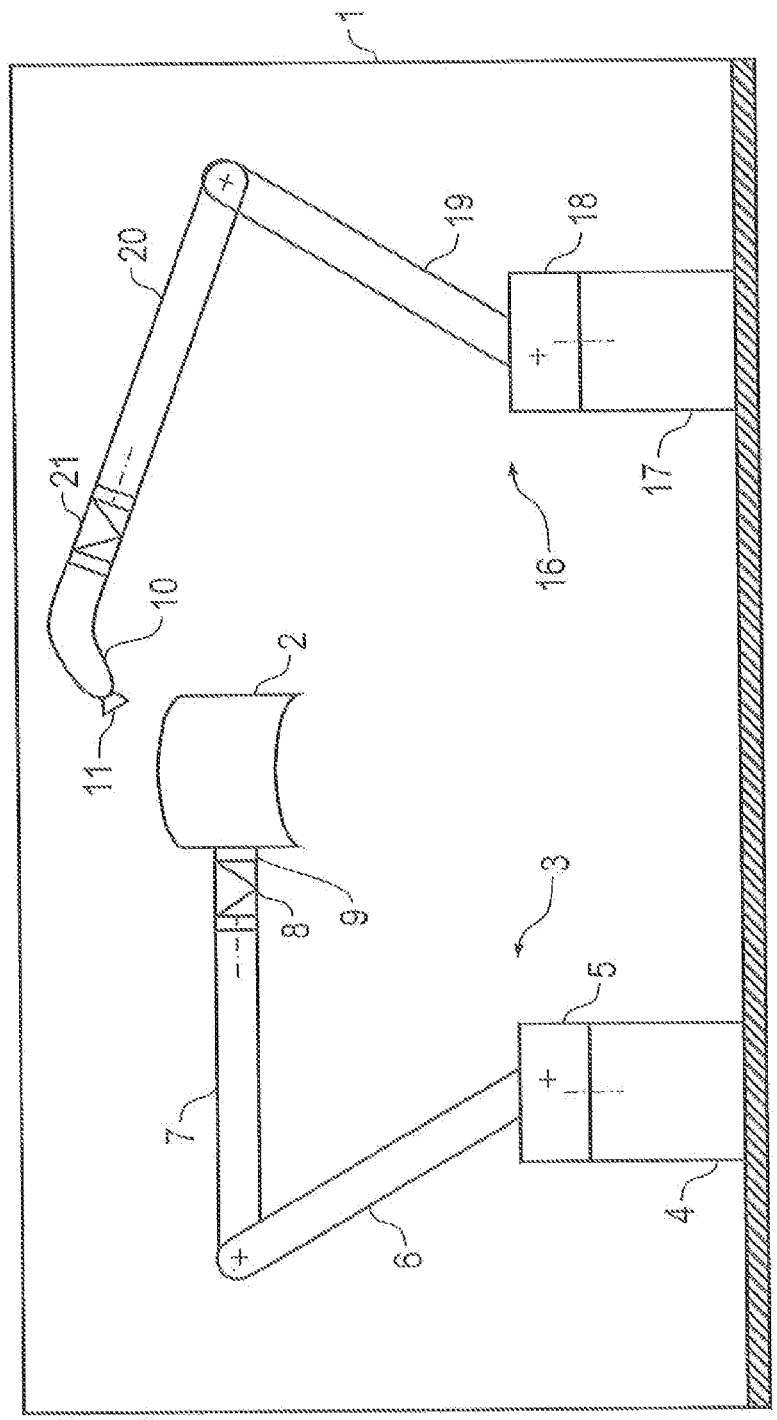
FIG. 5 shows an alternative embodiment of a paint booth in accordance with the invention with a handling robot for positioning the components to be coated and an application robot for highly mobile guiding of the rotational atomizer inside the paint booth.

FIG. 5 shows a further embodiment of an inventive paint booth, which in turn is partially identical to the previously described embodiments so that general reference is made to the previous description to avoid repetitions, where the same reference numerals are used for identical parts.

One special feature of this embodiment is that the rotary atomizer 10 is not mounted to the ceiling of the paint booth 1, but is guided in a highly mobile manner by a multi-axis application robot 16. The application robot 16 is likewise generally conventional in design so that the construction of the application robot 16 is described only briefly in what follows.

The application robot 16 has a fixed base 17 which is attached to the floor of the paint booth 1, or to its foundation, respectively. A carousel 18 is carried rotatably on the base 17, where the carousel 18 is carries two pivoting robot arms 19, 20. A multi-axis robot wrist axis 21 is attached at the distal end of the robot arm 20 which carries the rotary atomizer in a highly moveable manner. In this embodiment, both the component to be coated 2 and the rotary atomizer 10 can be carried in a highly moveable manner.

Figure 6:
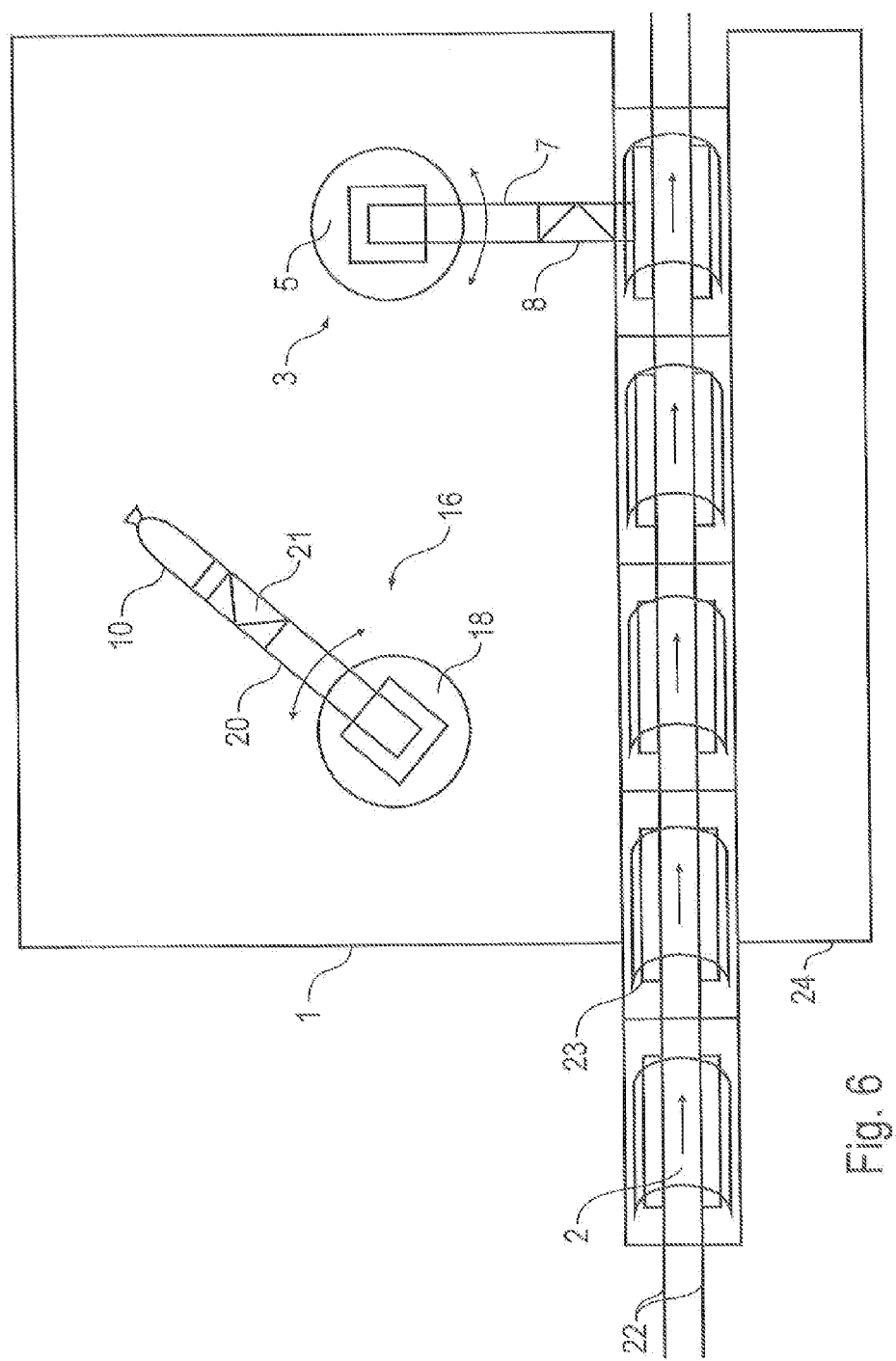
FIG. 6 shows a schematic representational drawing of the paint booth from FIG. 5.

FIG. 6 shows a plan view of the paint booth 1 from FIG. 5 from which it can be seen how the components to be coated 2 are brought into the paint booth. A transport rail 22 runs through the paint booth 1 on which the components 2 can be transported by means of a moveable holding device 23.

There is a control zone 24 on the side of the transport rail 1 lying opposite the paint booth 1.

Figure 7:
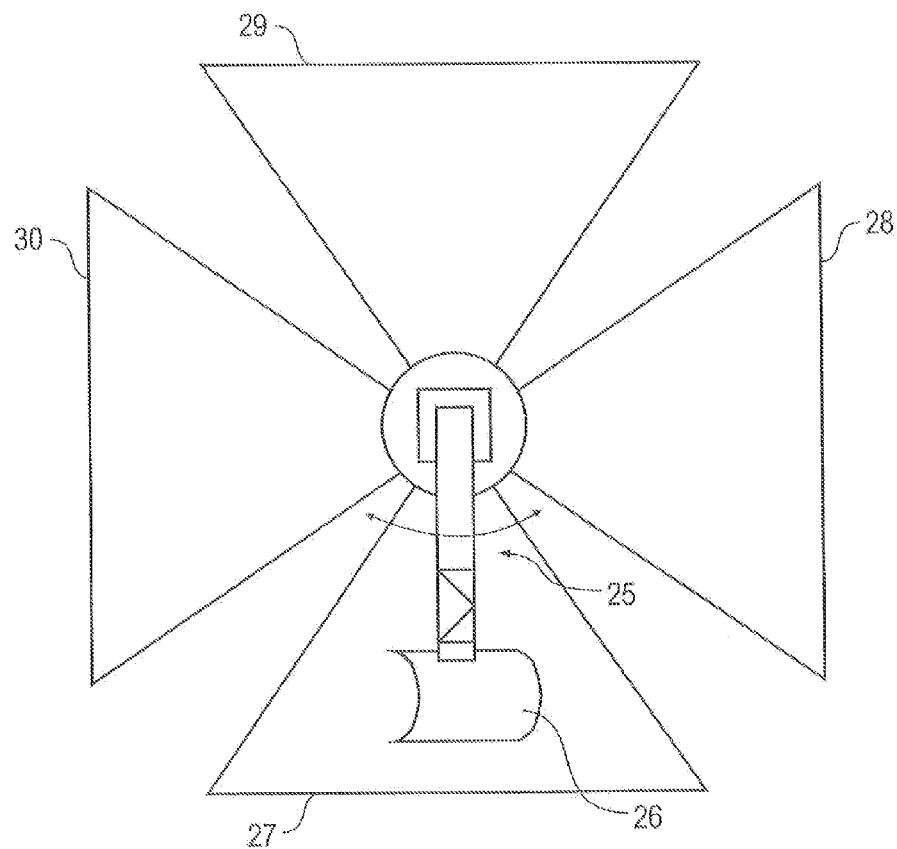
FIG. 7 shows an invention painting installation with a handling robot for positioning the components to be coated in three paint booths arranged in a star formation around the handling robot.

FIG. 7 shows in addition a variant of the invention having a handling robot 25 to position a component 26 to be coated in several spatially separated paint booths 27, 28, 29 where the paint booths 27-29 are located in a stellate disposition around the handling robot 25. The handling robot 25 can thus furnish all the paint booths 27-29 with the component 26 to be coated.

In addition, the paint installation in this embodiment has an additional zone 30 for component supply and transportation equipment.

Figure 8:
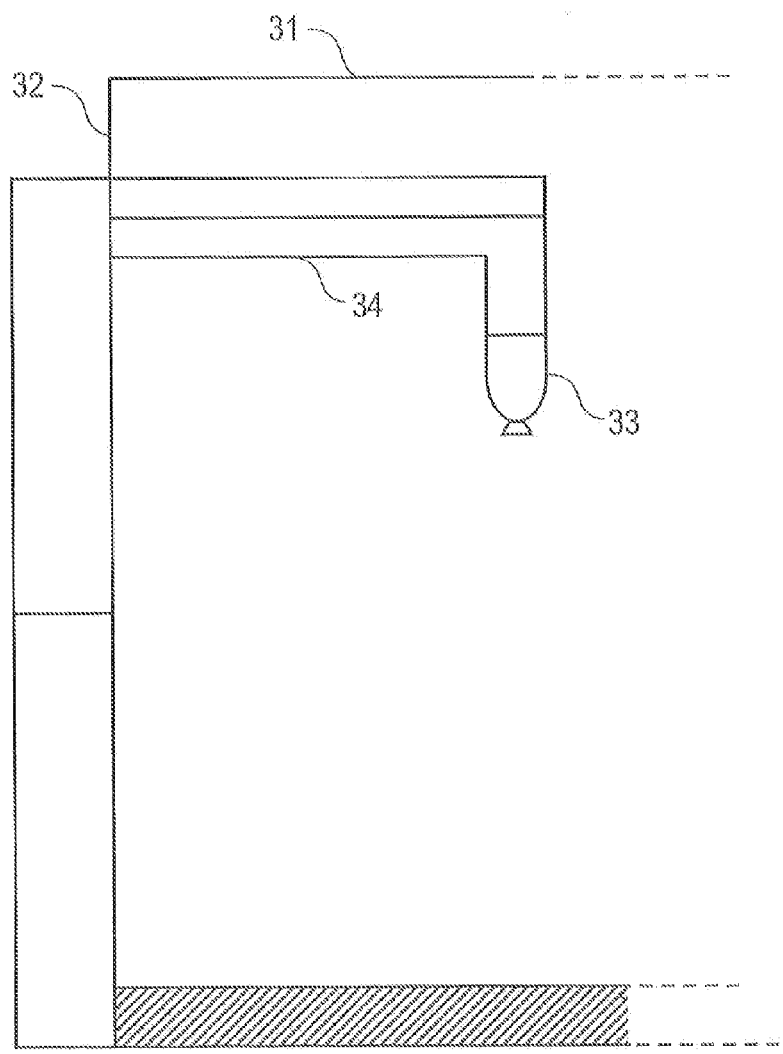
FIG. 8 shows a schematic side view of paint booth in accordance with the invention having a side-wall installation for the rotational atomizer.

Finally, FIG. 8 shows a simplified side view of a paint booth 31 which has a side wall 32 in which a rotary atomizer 33 is mounted by means of an arm 34.

The invention is not limited to the previously described detailed embodiments. A plurality of variants and modifications is possible which similarly make use of the inventive idea and therefore fall within the scope of its protection. While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A coating installation for coating components, comprising:
    at least one atomizer for applying a coating to the components;
    a supply device for supplying components to a suitable coating position relative to the atomizer, wherein the supply device has at least one handling robot which brings the components into the coating position; wherein the handling robot is configured to move one of the components while the atomizer applies the coating to the one of the components, thereby moving the one of the components relative to the atomizer while the atomizer applies the coating to the one of the components;
    a paint booth having a fixed structure; and
    a parallel kinematic, wherein the atomizer is mounted movably to the fixed structure with the parallel kinematic.

2. The coating installation of claim 1, wherein the supply device has several handling robots which together bring at least one of the components into the coating position.

3. The coating installation of claim 1, wherein the handling robot is configured to pick up a plurality of components and brings the components together to the coating position.

4. The coating installation of claim 1, wherein the handling robot has a holding device which picks up and holds the components.

5. The coating installation of claim 1, wherein the holding device comprises at least one of the following elements: a hook, an eye, a gripper, a suction cup, a magnet, and a clamping-spreader device.

6. The coating installation of claim 1, wherein the atomizer is located in a paint booth on the ceiling of the paint booth.

7. The coating installation of claim 1, wherein the atomizer has a variable adjustment angle.

8. The coating installation of claim 1, wherein the atomizer is attached to an application robot or to a parallel kinematic.

9. The coating installation of claim 1, wherein a plurality of atomizers are located in a paint booth.

10. The coating installation of claim 1, wherein several paint booths, spatially separated from one another, each has at least one atomizer, where the handling robot can position the components in the different paint booths in suitable coating positions relative to the specific atomizers.

11. The coating installation of claim 9, wherein a first one of the atomizers is configured to supply a first coating, and a second one of the atomizers is configured to apply a second coating different from the first coating.

12. The coating installation of claim 9, wherein two of the atomizers are configured to apply coatings to the components alternatively, such that a first one of the two atomizers may carry out a color change while a second one of the two atomizers applies a coating to one of the components.

13. The coating installation of claim 1, wherein the atomizer has substantially no freedom of motion such that relative motion between the one of the components and the atomizer is determined substantially entirely by the handling robot.

14. The coating installation of claim 1, wherein the atomizer is installed to the fixed structure with substantially no freedom of motion such that relative motion between the one of the components and the atomizer is determined substantially entirely by the handling robot.

15. A coating installation for coating components, comprising:
    at least one paint booth having a fixed structure;
    at least one application device for applying a coating to the components, the application device including a rotary atomizer, wherein the at least one application device is installed to the fixed structure; and
    a supply device for supplying components to a suitable coating position relative to the application device, wherein the supply device has at least one handling robot which brings the components into the coating position; wherein the handling robot is configured to move one of the components while the application device applies the coating to the one of the components, thereby moving the one of the components relative to the application device while the application device applies the coating to the one of the components; and
    a parallel kinematic, wherein the application device is mounted movably to the fixed structure with the parallel kinematic.

16. The coating installation of claim 15, wherein the fixed structure is a ceiling of a paint booth.

17. A coating installation for coating components, comprising:
    at least one application device for applying a coating to the components;
    a supply device for supplying components to a suitable coating position relative to the application device, wherein the supply device has at least one handling robot which brings the components into the coating position; wherein the handling robot is configured to move one of the components while the application device applies the coating to the one of the components, thereby moving the one of the components relative to the application device while the application device applies the coating to the one of the components;

a paint booth having a fixed structure, wherein the application device is installed to the fixed structure; and a parallel kinematic, wherein the application device is mounted movably to the fixed structure with the parallel kinematic.

18. The coating installation of claim 17, wherein the application device is an atomizer.

* * * * *